(12) United States Patent
Jolly et al.

(10) Patent No.: US 11,025,044 B2
(45) Date of Patent: Jun. 1, 2021

(54) ELECTRICAL FLOOR BOX WITH LIGHT SOURCE ASSEMBLY

(71) Applicant: Thomas & Betts International LLC, Wilmington, DE (US)

(72) Inventors: Robert Kevin Jolly, Cordova, TN (US); Gregory Richards, Germantown, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 149 days.

(21) Appl. No.: 16/294,240

(22) Filed: Mar. 6, 2019

(65) Prior Publication Data

US 2019/0280470 A1 Sep. 12, 2019

Related U.S. Application Data

(60) Provisional application No. 62/639,140, filed on Mar. 6, 2018.

(51) Int. Cl.
*H02G 3/18* (2006.01)
*H01R 24/30* (2011.01)
(Continued)

(52) U.S. Cl.
CPC .............. *H02G 3/185* (2013.01); *F21S 8/022* (2013.01); *H01H 36/0006* (2013.01);
(Continued)

(58) Field of Classification Search
CPC combination set(s) only.
See application file for complete search history.

(56) References Cited

U.S. PATENT DOCUMENTS 1,928,198 A * 9/1933 Buchanan .............. H02G 3/185
174/57
2,448,832 A * 9/1948 Ross .................. H01R 13/7036
200/51.09
(Continued)

FOREIGN PATENT DOCUMENTS

CA 2552014 1/2007
DE 102007028940 1/2009

OTHER PUBLICATIONS

Canadian Office Action, CA Application No. 3035776, 5 pgs., dated Apr. 15, 2020 2020.

*Primary Examiner* — William H. Mayo, III
*Assistant Examiner* — Krystal Robinson
(74) *Attorney, Agent, or Firm* — Taft Stettinius & Hollister LLP

(57) ABSTRACT

An electrical floor box includes a body having an open top and defining an interior therewithin, a cover flange configured to be mounted on the open top of the body, a cover assembly connected to the cover flange such that it is repositionable between open and closed positions, and a light source assembly arranged within the electrical floor box. The light source assembly includes a magnet attached to a bottom surface of the cover assembly, a magnet reed switch installed on the cover flange, a LED light electrically connected to the magnetic reed switch, and a wiring tunnel configured to hold the LED light therewithin. When the cover assembly is in the open position, the magnet disengages with the magnet reed switch such that the LED light illuminates the interior of the electrical floor box.

19 Claims, 5 Drawing Sheets

(51) Int. Cl.
*H01R 25/00* (2006.01)
*H01H 36/00* (2006.01)
*F21S 8/02* (2006.01)
*H01R 13/40* (2006.01)
*F21Y 115/10* (2016.01)

(52) U.S. Cl.
CPC ............ *H01R 13/40* (2013.01); *H01R 24/30* (2013.01); *H01R 25/006* (2013.01); *F21Y 2115/10* (2016.08)

(56) References Cited

U.S. PATENT DOCUMENTS

| | | | |
|---|---|---|---|
| 3,932,696 A * | 1/1976 | Fork | E04B 5/48 174/482 |
| 3,976,961 A * | 8/1976 | Moore | H05B 6/6408 335/146 |
| 4,000,405 A | 12/1976 | Horwinski | |
| 4,186,362 A * | 1/1980 | Kondo | H01H 36/0026 335/205 |
| 4,343,411 A * | 8/1982 | Chesnut | H02G 3/14 174/67 |
| 4,529,833 A * | 7/1985 | Weis | H02G 3/185 174/489 |
| 4,546,419 A | 10/1985 | Johnson | |
| 4,648,012 A | 3/1987 | Pittman, II | |
| 4,721,476 A * | 1/1988 | Zeliff | H02G 3/185 174/489 |
| 4,763,937 A * | 8/1988 | Sittnick, Jr. | E05B 49/00 292/251.5 |
| 4,828,513 A * | 5/1989 | Morrison | A47B 21/06 439/527 |
| 4,988,116 A * | 1/1991 | Evertsen | B60D 1/363 280/477 |
| 4,993,970 A * | 2/1991 | Littrell | H01R 25/006 174/490 |
| 5,032,690 A * | 7/1991 | Bloom | H02G 3/22 174/487 |
| 5,032,957 A | 7/1991 | Canfield | |
| 5,095,412 A | 3/1992 | French | |
| 5,107,072 A * | 4/1992 | Morgan | H02G 3/185 174/487 |
| 5,122,069 A * | 6/1992 | Brownlie | G02B 6/4451 174/53 |
| 5,160,808 A * | 11/1992 | Hadfield | H02G 3/185 174/480 |
| 5,467,565 A * | 11/1995 | Bowman | E04B 5/48 174/482 |
| 5,679,924 A * | 10/1997 | Young | H02G 3/14 174/50 |
| 5,833,350 A | 11/1998 | Moreland | |
| 5,893,627 A | 4/1999 | Taque | |
| 5,908,263 A | 6/1999 | Conners et al. | |
| 5,909,163 A * | 6/1999 | Posey | H01H 1/66 335/151 |
| 5,975,713 A | 11/1999 | Brothers | |
| 6,102,548 A | 8/2000 | Mantle et al. | |
| 6,417,446 B1 * | 7/2002 | Whitehead | H02G 3/185 174/484 |
| 6,419,379 B1 | 7/2002 | Hulse | |
| 6,428,191 B2 | 8/2002 | Ohura | |
| 6,601,969 B2 | 8/2003 | Barton | |
| 6,610,927 B2 * | 8/2003 | Dinh | H02G 3/088 174/66 |
| 6,666,372 B1 | 12/2003 | Nagel | |
| 6,749,319 B1 | 6/2004 | Muse | |
| 6,783,267 B1 | 8/2004 | Yoeman et al. | |
| 6,808,283 B2 | 10/2004 | Tsao | |
| 6,945,581 B2 | 9/2005 | Taylor | |
| 7,011,422 B2 | 3/2006 | Robertson et al. | |
| 7,033,040 B2 | 4/2006 | Spahr et al. | |
| 7,045,706 B1 * | 5/2006 | Lincoln, III | H02G 3/185 174/482 |
| 7,276,662 B2 * | 10/2007 | Drane | H02G 3/185 174/66 |
| 7,350,692 B2 | 4/2008 | Bushee et al. | |
| 7,364,443 B1 * | 4/2008 | McGinnis | H01R 35/02 439/131 |
| 7,511,231 B2 * | 3/2009 | Drane | H02G 3/185 174/482 |
| D626,069 S * | 10/2010 | Byrne | D13/139.4 |
| 7,825,335 B2 * | 11/2010 | Carbone | H02G 3/185 174/50 |
| 7,984,997 B1 * | 7/2011 | Sandberg | F21S 9/03 362/101 |
| 8,001,737 B1 * | 8/2011 | Price | F16L 5/04 52/220.8 |
| 8,013,242 B1 * | 9/2011 | Thibault | H02G 3/185 174/53 |
| 8,119,910 B1 | 2/2012 | Golden et al. | |
| 8,240,872 B1 | 8/2012 | Horn | |
| 8,307,590 B2 * | 11/2012 | Smith | E04D 13/1407 52/198 |
| 8,511,846 B1 | 8/2013 | Sandberg | |
| 8,519,276 B2 * | 8/2013 | Isaacks | H02G 3/185 174/486 |
| 9,035,182 B2 * | 5/2015 | Scanzillo | H02G 3/088 174/67 |
| 9,077,166 B2 * | 7/2015 | Dinh | H02G 3/088 |
| 9,673,598 B2 * | 6/2017 | DeBartolo, Jr. | H02G 3/185 |
| 10,283,949 B2 * | 5/2019 | Thomas | H02G 3/088 |
| 10,454,261 B2 * | 10/2019 | Zheng | H02G 3/185 |
| 10,770,875 B2 * | 9/2020 | Byrne | H02G 3/185 |
| 2002/0066581 A1 * | 6/2002 | Bashford | H02G 3/123 174/50 |
| 2002/0134568 A1 * | 9/2002 | Dinh | H02G 3/185 174/50 |
| 2003/0109172 A1 * | 6/2003 | Foden | E04B 5/48 439/535 |
| 2004/0008517 A1 * | 1/2004 | Bixler | H01H 35/022 362/394 |
| 2004/0106313 A1 * | 6/2004 | Drane | H01R 13/447 439/142 |
| 2004/0150984 A1 | 8/2004 | Robertson et al. | |
| 2004/0175975 A1 * | 9/2004 | Drane | H01R 13/5213 439/138 |
| 2007/0014102 A1 * | 1/2007 | Drane | H02G 3/185 362/153 |
| 2007/0115653 A1 * | 5/2007 | Cea | A45C 15/06 362/104 |
| 2007/0181328 A1 * | 8/2007 | Dinh | H02G 3/121 174/50 |
| 2008/0170388 A1 * | 7/2008 | Greil | F25D 27/00 362/155 |
| 2008/0236884 A1 * | 10/2008 | Arbel | H02G 3/14 174/520 |
| 2009/0159308 A1 * | 6/2009 | Thibault | H02G 3/18 174/66 |
| 2010/0072198 A1 * | 3/2010 | Roemer | H02G 3/185 220/3.3 |
| 2010/0077681 A1 * | 4/2010 | McCleskey | H02G 3/088 52/220.1 |
| 2010/0163301 A1 * | 7/2010 | Jolly | H02G 3/185 174/488 |
| 2012/0026714 A1 * | 2/2012 | Martino | H02G 3/123 361/809 |
| 2012/0231657 A1 * | 9/2012 | Bouse | H02G 3/185 439/535 |
| 2013/0078853 A1 * | 3/2013 | Dinh | H02G 3/14 439/535 |
| 2013/0192869 A1 * | 8/2013 | Drane | H02G 3/185 174/67 |
| 2014/0334139 A1 * | 11/2014 | Smith | F21S 9/02 362/191 |
| 2015/0333461 A1 * | 11/2015 | Byrne | H02M 7/003 361/623 |
| 2017/0365136 A1 * | 12/2017 | Torre Sarmiento | F21S 9/022 |
| 2018/0048093 A1 * | 2/2018 | Byrne | H01R 13/6683 |

* cited by examiner

US 11,025,044 B2

ELECTRICAL FLOOR BOX WITH LIGHT SOURCE ASSEMBLY

FIELD OF THE INVENTION

The present invention relates to electrical floor boxes, and more particularly, to an electrical floor box with a light source assembly configured to automatically illuminate the interior thereof when the electrical floor box is open.

BACKGROUND

Generally, electrical floor boxes are installed and used in buildings to provide electrical power and/or data in areas where wall outlet boxes are not available. These electrical floor boxes are normally installed into a floor so that wires/cables can installed underneath the floor. A typical electrical floor box includes a body and a cover attached to the body to open and close the interior of the electrical floor box. While various electrical devices/components are contained within the interior of the body of the box, it can be difficult to locate certain components in the dark and without an adequate lighting system.

Accordingly, although various electrical floor boxes are currently available in the marketplace, there is a need for an electrical floor box with a light source assembly such that the interior of the electrical floor box can be illuminated when it is open.

SUMMARY

According to an embodiment of the present invention, an electrical floor box includes a body having an open top and defining an interior therewithin, a cover flange configured to be mounted on the open top of the body, a cover assembly connected to the cover flange such that it is repositionable between open and closed positions, and a light source assembly arranged within the electrical floor box. The light source assembly includes a magnet attached to a bottom surface of the cover assembly, a magnet reed switch installed on the cover flange, a LED light electrically connected to the magnetic reed switch, and a wiring tunnel configured to hold the LED light therewithin. When the cover assembly is in the open position, the magnet disengages with the magnet reed switch such that the LED light illuminates the interior of the electrical floor box.

These and other aspects of the present invention will be better understood in view of the drawings and following detailed description.

DETAILED DESCRIPTION

Figure 1:
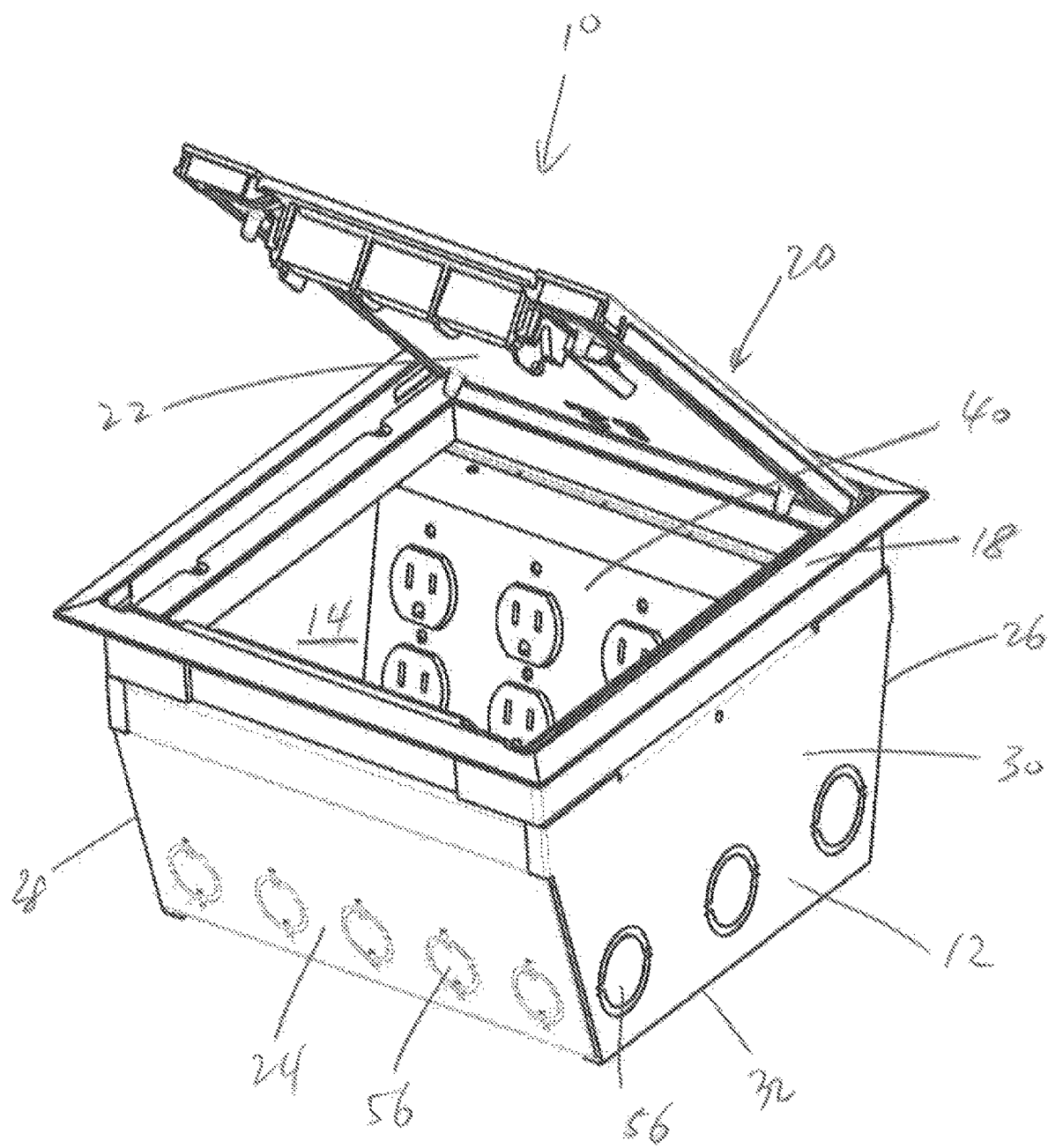
FIG. 1 is a perspective view of an electrical floor box, according to an embodiment of the present invention, in an open position.
Figure 2:
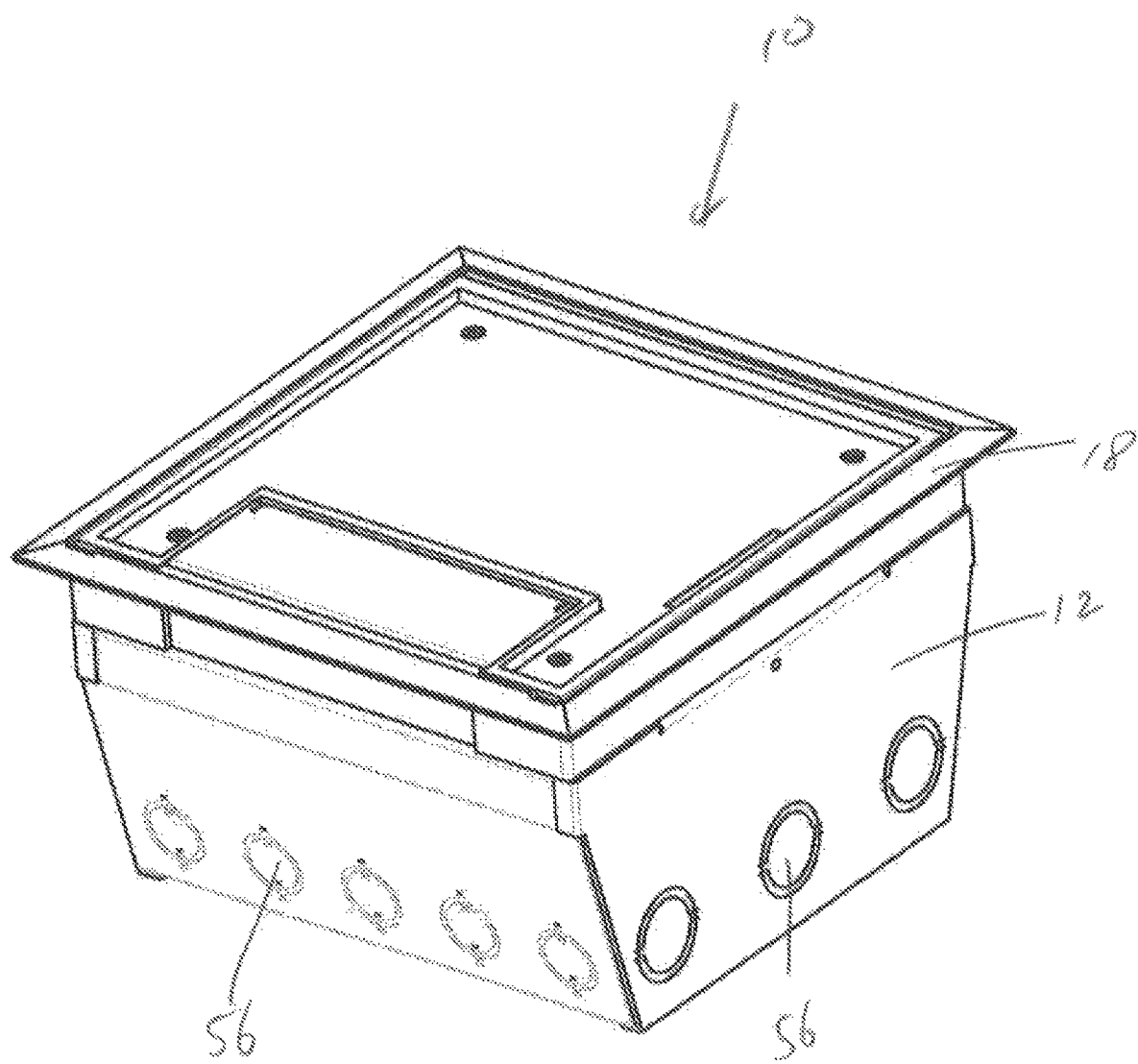
FIG. 2 is a perspective view of the electrical floor box in FIG. 1 in a closed position.
Figure 3:
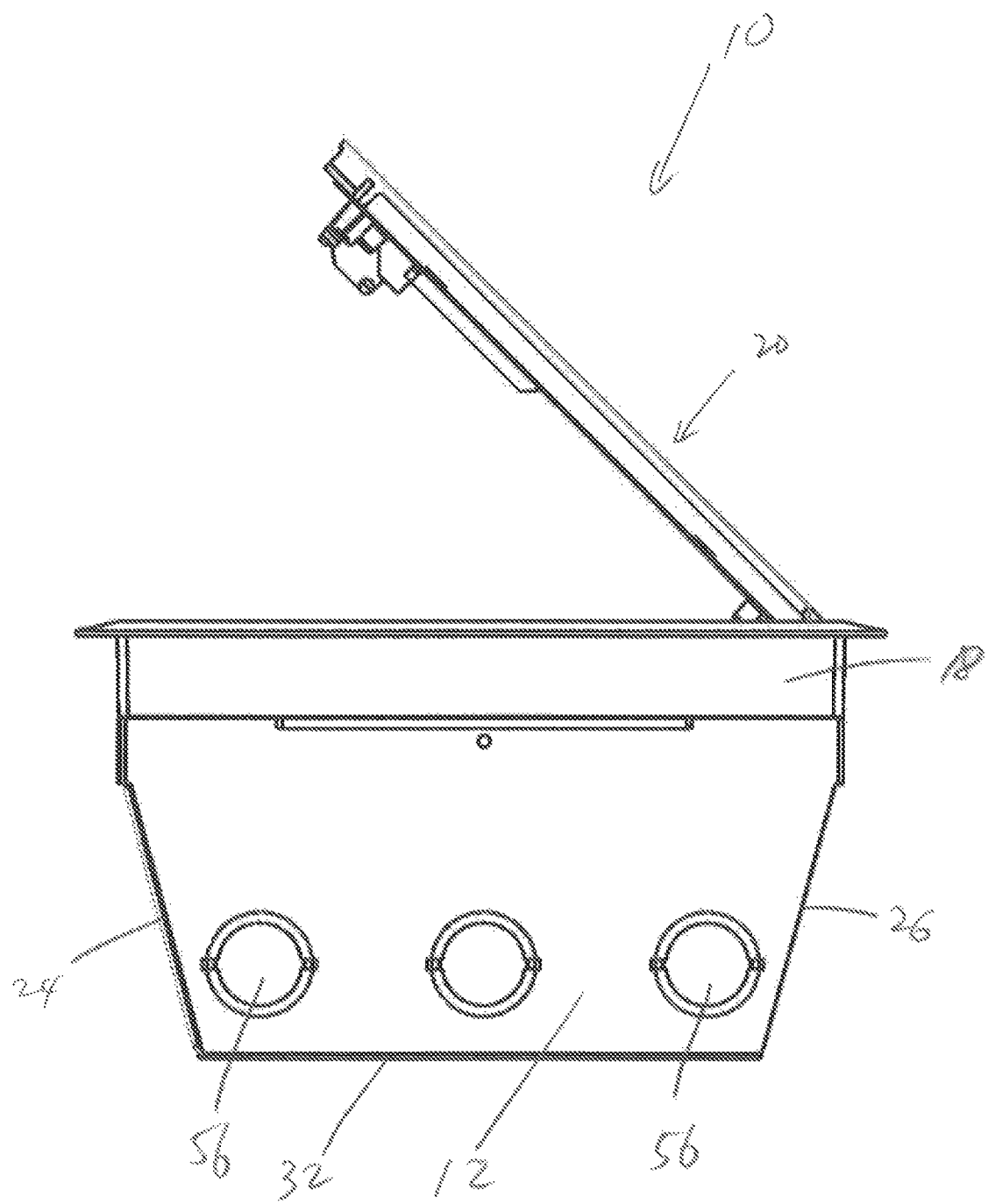
FIG. 3 is side view of the electrical floor box in FIG. 1.

According to an embodiment of the present invention, referring to FIG. 1, there is shown an electrical floor box 10 adapted to be installed into a floor receiving hole of a floor structure. The electrical floor box 10 is designed and configured to provide a housing, such that one or more electrical components (e.g., electrical power receptacles, data connections, etc.) can be disposed/installed therewithin.

Referring to FIGS. 1-5, the electrical floor box 10 includes a body 12 defining an interior 14, a light source assembly 16 configured to illuminate the interior 14 of the body 12, a cover flange 18 configured to be disposed on a top of the body 12, and a cover assembly 20 connected to the cover flange 18 that is repositionable between open (FIG. 1) and closed (FIG. 2) positions so as to cover and uncover the interior 14 of the body 12.

Directional terms, such as front, rear, top, and bottom are referenced to an orientation in which the electrical floor box 10 is placed such that, when it is in the open position, a bottom surface 22 of the cover assembly 20 faces forward. However, the present invention is not thereby limited to use in any particular orientation.

Referring again to FIGS. 1-3, in the depicted embodiment, the body 12 is a generally rectangular housing having an open top. The body 12 includes opposed inclined front and rear walls 24, 26, opposed first and second side walls 28, 30, and a base 32 extending between the walls 24, 26, 28, 30. Thus, the front and rear walls 24, 26 are separated by the base 32, and the first and second side walls 28, 30 are also separated by the base 32.

The side walls 28, 30 are connected to the base 32 and extend laterally upward therefrom such that they are substantially perpendicular to the base 32. The inclined front and rear walls 24, 26 are also connected to the base 32 and extend laterally upward therefrom with an obtuse angle relative to the base 32. The front wall 24, rear wall 26, side walls 28, 30, and the base 32 of the body 12 cooperatively define the interior 14 for housing electrical components.

Figure 4:
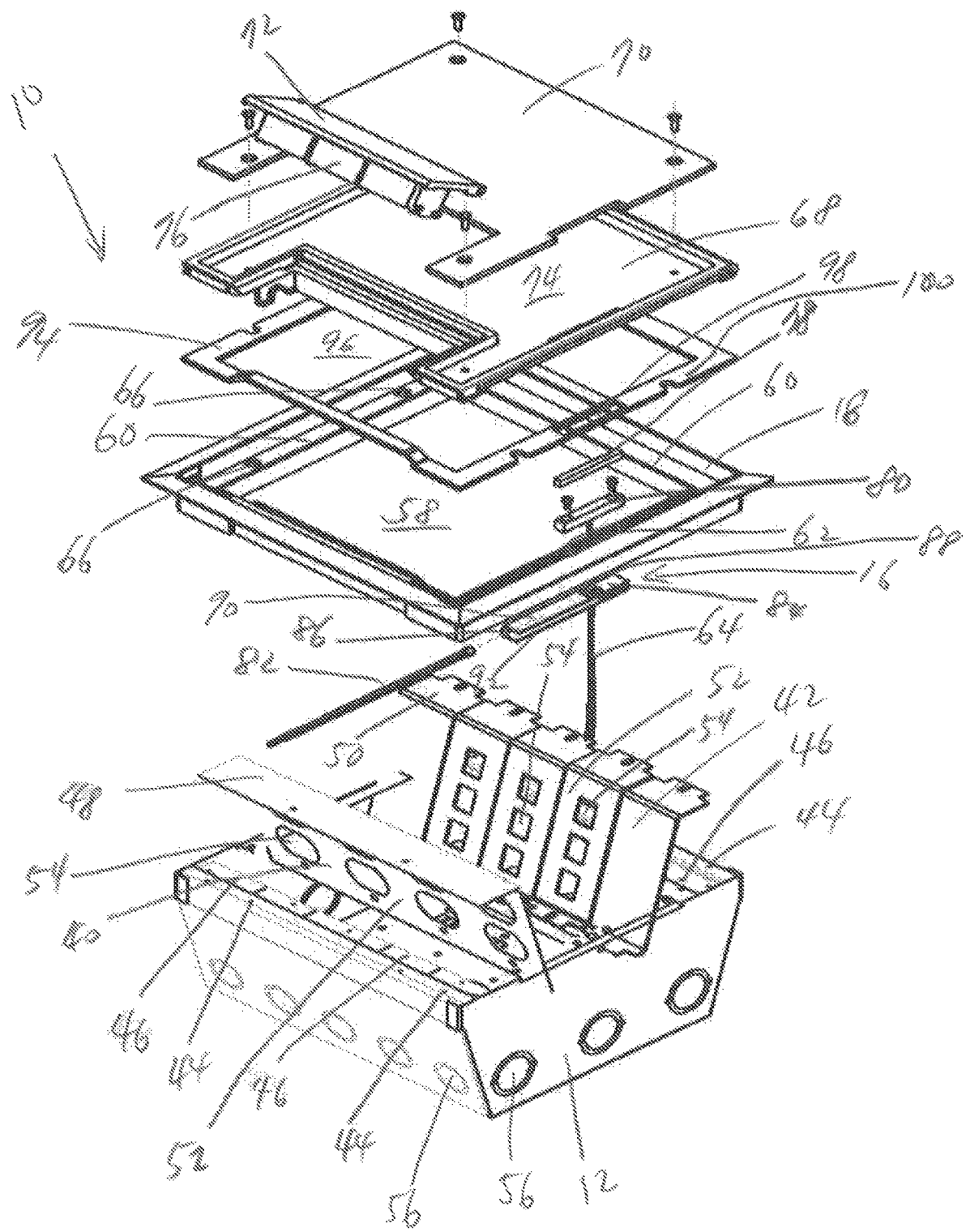
FIG. 4 is an exploded perspective view of the electrical floor box in FIG. 1.
Figure 5:
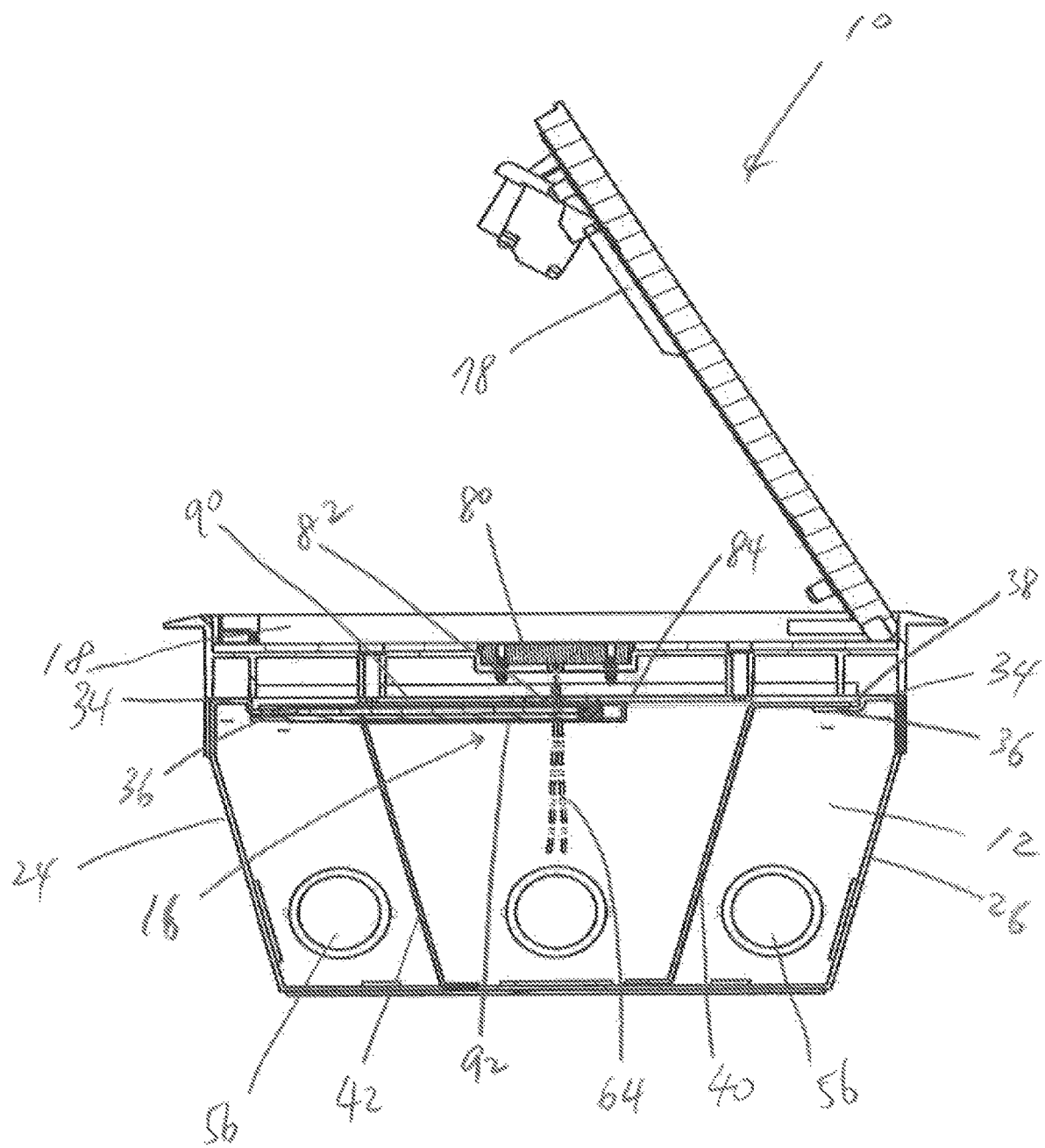
FIG. 5 is a cross-sectional view of FIG. 3.

Referring to FIGS. 4 and 5, each of the front and rear walls 24, 26 includes a flat top 34 and a flange 36. As shown in FIG. 5, each flange 36 extends laterally from the flat top 34 and towards the center of the body 12 with a recess 38 therebetween. The recess 38 allows a power plate 40 and a data plate 42 to be secured onto the flanges 36, as will be described in greater detail below.

A plurality of cover mounting holes 44 extend through each flat top 34 of the body 12 such that the cover flange 18 can be attached to the body 12. A plurality of plate mounting holes 46 are defined on each flange 36 of the body 12 to secure the power plate 40 and data plate 42 thereon and within the interior 14 of the body 12, as shown in FIG. 4. Specifically, a top member 48, 50 of each of the power plate 40 and data plate 42 is engaged with and secured to the corresponding flange with fasteners (not shown) such as screws. Each plate 40, 42 includes an inclined member 52 with a plurality of apertures 54 defined thereon. The plurality of apertures 54 allow electrical and communication (data) outlets to be placed and fastened therewithin.

A plurality of knockouts 56 are defined and stamped onto the walls 24, 26, 28, 30 and the base 32 of the body 12 to provide a convenient method of creating knockout openings thereon to allow routing of electrical and communication wires (not shown) to and from the body 12. The plurality of knockouts 56 may be constructed as multiple ring knockouts to provide various sizes for the knockout openings on the body 12. The plurality of knockouts 56 may be removed prior to mounting the body 12 to a floor.

Referring more particularly to FIG. 4, the cover flange 18 defines a cover flange opening 58 and is dimensioned and configured to be mounted on the open top of the body 12. The cover flange 18 includes a plurality of inner tab members 60 that extend laterally from each side and towards the center of the cover flange 18. In the depicted embodiment, a switch wire aperture 62 is defined on the right inner tab member of the cover flange 18, through which magnetic reed switch wires 64 can be passed through and placed into the interior 14 of the body 12. Alternatively, the switch wire aperture 62 may be defined on any one of the inner tab members 60 of the cover flange 18.

The cover flange 18 may be attached to the body 12 from the open top thereof with fasteners, such as screws. Specifically, the cover flange 18 is placed over the open top of the body 12 such that a plurality of cover flange mounting holes 66 defined on the inner tab members 60 align with the plurality of cover mounting holes 44 on the flat tops 34 of the body 12. Thereafter, fasteners can be inserted through the aligned holes 66, 44 to affix the cover flange 18 onto the body 12.

The cover assembly 20 is configured to cover and protect the electrical components disposed within the interior 14 of the body 12. In addition, the cover assembly 20 provides an access to various components disposed within the body 12 when the cover assembly 20 is in the open position.

The cover assembly 20 includes a cover lid 68, a metal plate 70, and a wiring access member 72. The cover lid 68 is hingedly connected and secured to the cover flange 18 and moveable between the open and closed positions. A cover lid recess 74 is defined throughout a top of the cover lid 68 such that the metal plate 70 can be seated therewithin and secured to the cover lid 68 using fasteners such as screws. The wiring access member 72 is hingedly connected to the cover lid 68 at a front portion thereof. A lined cushioned material 76, such as foam rubber, is attached to a bottom surface of the wiring access member 72. The cushioned material 76 prevents abrading and damages to wires that pass through the wiring access member 72.

Referring again to FIGS. 4 and 5, in the depicted embodiment, the light source assembly 16 is installed and arranged within the interior 14 of body 12 of the electrical floor box 10. The light source assembly 16 includes a magnet 78, a magnet reed switch 80 installed on the cover flange 18, a LED light 82 electrically connected to the magnetic reed switch 80, and a wiring tunnel 84 configured to hold the LED light 82. The magnet 78 is attached to the bottom surface of the cover lid 68 such that it aligns and magnetically adheres with the magnet reed switch 80 when the cover assembly 20 is in the closed position. Thus, when the cover assembly 20 is open, the magnet 78 disengages with the magnet reed switch 80, allowing the magnet reed switch 80 to turn on the LED light 82. Likewise, when the cover assembly 20 is closed, the magnet 78 engages with the magnet reed switch 80, allowing the magnet reed switch 80 to turn off the LED light 82.

In the depicted embodiment, the wiring tunnel 84 is secured to the bottom of the right inner tab member of the cover flange 18, as shown in FIG. 5, to provide a means for holding the LED light 82. Specifically, the LED light 82 can be placed and disposed within the wiring tunnel 84 by inserting into an open end 86 of the wiring tunnel 84. A wiring aperture 88 is defined on top and bottom members 90, 92 of the wiring tunnel 84 such that, when the wiring tunnel 84 is secured to the cover flange 18, the switch wire aperture 62 of the cover flange 18 and the wiring aperture 88 of the wiring tunnel 84 align. The aligned apertures 62, 88 provide a pathway for the magnetic reed switch wires 64 to enter the interior 14 of the body 12.

In the depicted embodiment, electrical power for the light source assembly 16 is supplied by AC power, such as 120 VAC. Alternatively, the magnet reed switch 80 may be electrically connected to a battery source for supplying electrical power for the light source assembly 16.

Referring again to FIG. 4, the electrical floor box 10 may further include a gasket 94 having a gasket opening 96. The gasket 94 is disposed and arranged between the cover flange 18 and the cover assembly 20 to provide environmental protection when the cover assembly 20 is in the closed position. Specifically, the gasket 94 may be retained on the undersurface of the cover lid 68 and engage with the inner tab members 60 of the cover flange 18. In the depicted embodiment, a magnet reed switch aperture 98 is defined on a right inturned member 100 of the gasket 94, through which the magnet reed switch 80 can be placed therewithin. Alternatively, the magnet reed switch aperture 98 may be defined on any one of the inturned members of the gasket 94. Once the gasket 94 is secured to the cover flange 18, the gasket opening 96 aligns with the cover flange opening 58.

From the foregoing, it will be appreciated that an electrical floor box according to the present application includes a light source assembly such that when the floor box is open, the light source assembly illuminates the interior of the electrical floor box.

According to one aspect of the present application, an electrical floor box includes a body having an open top and defining an interior therewithin, a cover flange configured to be mounted on the open top of the body, a cover assembly connected to the cover flange such that it is repositionable between open and closed positions, and a light source assembly arranged within the electrical floor box. The light source assembly includes a magnet attached to a bottom surface of the cover assembly, a magnet reed switch having magnetic reed switch wires with the magnet reed switch installed on the cover flange, a LED light electrically connected to the magnetic reed switch, and a wiring tunnel having an open end, the wiring tunnel configured to hold the LED light therewithin.

In one embodiment, the magnet reed switch is positioned on the cover flange such that, when the cover assembly is in the closed position, the magnet magnetically adheres to the magnet reed switch. In another embodiment, when the cover assembly is in the open position, the magnet disengages with the magnet reed switch such that the LED light illuminates the interior of the electrical floor box.

In yet another embodiment, the cover flange includes a plurality of inner tab members that extend laterally from each side of the cover flange and towards the center of the cover flange. In a refinement of this embodiment, a switch wire aperture is defined on one of the inner tab members of the cover flange, through which the magnetic reed switch wires can be passed through and placed into the interior of the body of the electrical floor box.

In a further embodiment, the wiring tunnel is secured to the bottom of the cover flange. In a refinement of this embodiment, a wiring aperture is defined on top and bottom members of the wiring tunnel such that, when the wiring tunnel is secured to the bottom of the cover flange, the switch wire aperture and the wiring aperture align to provide a pathway for the magnetic reed switch wires to enter the interior of the body of the electrical floor box.

In another embodiment, electrical power for the light source assembly is supplied by AC power. In yet another embodiment, the magnet reed switch is electrically connected to a battery source for supplying electrical power for the light source assembly. In a further embodiment, the LED light is placed and disposed within the wiring tunnel by inserting into the open end of the wiring tunnel.

In another embodiment, the cover assembly includes a cover lid, a metal plate, and a wiring access member. In one refinement of this embodiment, the cover lid is hingedly connected and secured to the cover flange. In another refinement, a cover lid recess is defined throughout a top of the cover lid such that the metal plate can be seated therewithin and secured to the cover lid. In yet another refinement, a lined cushioned material is attached to a bottom surface of the wiring access member to prevent abrading and damages to wires that pass through the wiring access member.

In another embodiment, floor box includes a gasket. In a refinement of this embodiment, the gasket is configured to be arranged between the cover flange and the cover assembly to provide environmental protection when the cover assembly is in the closed position. In a further refinement, a magnet reed switch aperture is defined on one of inturned members of the gasket, through which the magnet reed switch can be placed therewithin.

In another embodiment, the body is a rectangular housing having an open top. In yet another embodiment, the body includes opposed inclined front and rear walls, opposed first and second side walls, and a base extending between the walls. In a refinement of this embodiment, each of the front and rear walls includes a flat top and a flange, and the flange extends laterally from the flat top and towards the center of the body with a recess such that a gap is created between the flange and the flat top.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. An electrical floor box comprising:
   a body having an open top and defining an interior therewithin;
   a cover flange configured to be mounted on the open top of the body, the cover flange including a switch wire aperture passing therethrough;
   a cover assembly connected to the cover flange such that the cover assembly is repositionable between open and closed positions; and
   a light source assembly arranged within the electrical floor box, the light source assembly including:
      a magnet attached to a bottom surface of the cover assembly;
      a magnet reed switch having magnetic reed switch wires, the magnet reed switch installed on the cover flange;
      a LED light electrically connected to the magnetic reed switch, wherein in the closed position of the cover assembly the magnet engages the magnet reed switch to turn the LED light off and in the open position the magnet is disengaged from the magnet reed switch to turn the LED light on; and
      a wiring tunnel having an open end and, the LED light is inserted through the open end of the wiring tunnel, wherein the wiring tunnel is installed on a bottom of the cover flange and the wiring tunnel includes top and bottom members defining a wiring aperture that is aligned with the switch wire aperture of the cover flange, the magnetic reed switch wires passing through the aligned apertures into the interior of the body of the electrical floor box.

2. The electrical floor box of claim 1, wherein the cover flange includes an inner tab extending laterally from a side of the cover flange towards a center of the cover flange, and the wiring tunnel and the magnet reed switch are is positioned on the inner tab.

3. The electrical floor box of claim 1, wherein, when the cover assembly is in the open position, the LED light illuminates the interior of the electrical floor box.

4. The electrical floor box of claim 1, wherein the cover flange includes a plurality of inner tab members that extend laterally from each side of the cover flange and towards the center of the cover flange.

5. The electrical floor box of claim 1, wherein electrical power for the light source assembly is supplied by AC power.

6. The electrical floor box of claim 1, wherein the magnet reed switch is electrically connected to a battery source for supplying electrical power for the light source assembly.

7. The electrical floor box of claim 1, wherein the LED light is placed and disposed within the wiring tunnel by inserting into the open end of the wiring tunnel.

8. The electrical floor box of claim 1, wherein the cover assembly includes a cover lid, a metal plate, and a wiring access member.

9. The electrical floor box of claim 8, wherein the cover lid is hingedly connected and secured to the cover flange.

10. The electrical floor box of claim 8, wherein a cover lid recess is defined throughout a top of the cover lid such that the metal plate is seated within the cover lid recess and secured to the cover lid.

11. The electrical floor box of claim 8, wherein a lined cushioned material is attached to a bottom surface of the wiring access member to prevent abrading and damages to wires that pass through the wiring access member.

12. The electrical floor box of claim 1, further comprising a gasket.

13. The electrical floor box of claim 12, wherein the gasket is configured to be arranged between the cover flange and the cover assembly to provide environmental protection when the cover assembly is in the closed position.

14. The electrical floor box of claim 1, wherein the body is a rectangular housing having an open top.

15. The electrical floor box of claim 1, wherein the body includes opposed inclined front and rear walls, opposed first and second side walls, and a base extending between the walls.

16. An electrical floor box comprising:
   a body having an open top and defining an interior therewithin;
   a cover flange configured to be mounted on the open top of the body, wherein the cover flange includes a plurality of inner tab members that extend laterally from each side of the cover flange and toward a center of the cover flange;
   a cover assembly connected to the cover flange such that the cover assembly is repositionable between open and closed positions;
   a light source assembly arranged within the electrical floor box, the light source assembly including:
      a magnet attached to a bottom surface of the cover assembly;
      a magnet reed switch having magnetic reed switch wires, the magnet reed switch installed on the cover flange;
      a LED light electrically connected to the magnetic reed switch; and a wiring tunnel having an open end, the wiring tunnel configured to hold the LED light therewithin;

wherein a switch wire aperture is defined on one of the inner tab members of the cover flange, through which the magnetic reed switch wires are passed through and placed into the interior of the body of the electrical floor box.

17. The electrical floor box of claim 16, wherein a wiring aperture is defined on top and bottom members of the wiring tunnel such that, when the wiring tunnel is secured to the bottom of the cover flange, the switch wire aperture and the wiring aperture align to provide a pathway for the magnetic reed switch wires to enter the interior of the body of the electrical floor box.

18. An electrical floor box comprising:
a body having an open top and defining an interior therewithin:
a cover flange configured to be mounted on the open top of the body;
a cover assembly connected to the cover flange such that the cover assembly is repositionable between open and closed positions;
a light source assembly arranged within the electrical floor box, the light source assembly including:
  a magnet attached to a bottom surface of the cover assembly;
  a magnet reed switch having magnetic reed switch wires, the magnet reed switch installed on the cover flange;
  a LED light electrically connected to the magnetic reed switch; and
  a wiring tunnel having an open end, the wiring tunnel configured to hold the LED light therewithin; and a gasket arranged between the cover flange and the cover assembly to provide environmental protection when the cover assembly is in the closed position,
wherein a magnet reed switch aperture is defined on one of inturned members of the gasket, and through which the magnet reed switch is placed within the magnet reed switch aperture.

19. An electrical floor box comprising:
a body having an open top and defining an interior therewithin, wherein the body includes opposed inclined front and rear walls, opposed first and second side walls, and a base extending between the walls;
a cover flange configured to be mounted on the open top of the body;
a cover assembly connected to the cover flange such that the cover assembly is repositionable between open and closed positions;
a light source assembly arranged within the electrical floor box, the light source assembly including:
  a magnet attached to a bottom surface of the cover assembly;
  a magnet reed switch having magnetic reed switch wires, the magnet reed switch installed on the cover flange;
  a LED light electrically connected to the magnetic reed switch; and
  a wiring tunnel having an open end, the wiring tunnel configured to hold the LED light therewithin; and
wherein each of the front and rear walls includes a flat top and a flange, and wherein the flange extends laterally from the flat top and towards the center of the body with a recess such that a gap is created between the flange and the flat top.

* * * * *